US009251660B2

(12) United States Patent
Berman et al.

(10) Patent No.: US 9,251,660 B2

(45) **Date of Patent: *Feb. 2, 2016**

(54) GAMING ACTIVITY AWARDING SUBSEQUENT PLAYS USING RESULTS OF PREVIOUS PLAYS

(71) Applicant: KING SHOW GAMES, INC., Minnetonka, MN (US)

(72) Inventors: Bradley Berman, Minnetonka, MN (US); Chad Shapiro, Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,981

(22) Filed: Jun. 20, 2014

(65) Prior Publication Data

US 2014/0302903 A1 Oct. 9, 2014

Related U.S. Application Data

(63) Continuation of application No. 13/525,322, filed on Jun. 17, 2012, now Pat. No. 8,758,110, which is a continuation-in-part of application No. 12/603,808, filed on Oct. 22, 2009, now Pat. No. 8,202,150.

(51) Int. Cl.
*G06F 17/00* (2006.01)
*G07F 17/32* (2006.01)

(52) U.S. Cl.
CPC ............ *G07F 17/3267* (2013.01); *G07F 17/32* (2013.01); *G07F 17/3244* (2013.01); *G07F 17/3293* (2013.01)

(58) Field of Classification Search
USPC ............. 463/11–13, 16, 20, 42; 273/292, 293
See application file for complete search history.

(56) References Cited

U.S. PATENT DOCUMENTS

| | | | |
|---|---|---|---|
| 5,823,873 | A | 10/1998 | Moody |
| 5,882,259 | A | 3/1999 | Holmes et al. |
| 5,957,774 | A | 9/1999 | Holmes et al. |
| 6,220,959 | B1 | 4/2001 | Holmes et al. |
| 6,334,613 | B1 | 1/2002 | Yoseloff |
| 6,416,407 | B1 | 7/2002 | Carrico et al. |
| 6,435,509 | B2 | 8/2002 | Wichinsky et al. |
| 6,474,645 | B2 | 11/2002 | Tarantino |
| 6,511,068 | B1 | 1/2003 | Sklansky et al. |
| 6,533,658 | B1 | 3/2003 | Walker et al. |
| 6,612,927 | B1 | 9/2003 | Slomiany et al. |
| 6,651,985 | B2 | 11/2003 | Sines et al. |
| 6,672,958 | B2 | 1/2004 | Bennett |

(Continued)

OTHER PUBLICATIONS

Bally Technologies, "Bally Technologies Announces Nationwide Sales Rollout of Four New Video Poker Games", 2006, 2 pages.

(Continued)

*Primary Examiner* — Ronald Laneau

(57) ABSTRACT

Techniques involving awarding subsequent plays using results of previous plays. One representative technique includes dealing a first poker hand to a player, and enabling cards of the first poker hand to be held. Replacement cards are presented for any of the cards that were not held in the first poker hand, thereby creating a first resulting poker hand. All of the cards of the first resulting poker hand are duplicated into a second poker hand, where cards in the second poker hand may again be held/discarded. Replacement cards are presented for any of the cards that were not held in the second poker hand, thereby creating a second resulting poker hand. Duplication into additional hands may also be provided.

20 Claims, 12 Drawing Sheets

(56) References Cited

U.S. PATENT DOCUMENTS

| | | | |
|---|---|---|---|
| 7,255,642 | B2 | 8/2007 | Sines et al. |
| 7,389,990 | B2 | 6/2008 | Mourad |
| 7,419,162 | B2 | 9/2008 | Lancaster et al. |
| 7,544,129 | B2 | 6/2009 | Baerlocher |
| 7,704,136 | B2 | 4/2010 | Shackleford et al. |
| 7,740,533 | B2 | 6/2010 | Walker et al. |
| 7,753,267 | B2 | 7/2010 | Hansen et al. |
| 7,845,642 | B2 | 12/2010 | Krise |
| 8,123,604 | B2 | 2/2012 | Lancaster et al. |
| 8,449,364 | B2 * | 5/2013 | Lancaster et al. ............... 463/13 |
| 2003/0162424 | A1 | 8/2003 | Berman |
| 2006/0084506 | A1 | 4/2006 | Yoseloff et al. |
| 2006/0131809 | A1 * | 6/2006 | Lancaster et al. ............. 273/292 |
| 2006/0135238 | A1 | 6/2006 | Lancaster et al. |
| 2006/0199632 | A1 | 9/2006 | Thomas et al. |
| 2007/0135196 | A1 * | 6/2007 | Caissie et al. ................... 463/13 |
| 2008/0064462 | A1 | 3/2008 | Gerrard et al. |
| 2008/0070674 | A1 | 3/2008 | Lancaster et al. |
| 2008/0076500 | A1 | 3/2008 | Lancaster et al. |
| 2008/0272546 | A1 | 11/2008 | Forster |
| 2009/0005144 | A1 | 1/2009 | Moody |
| 2010/0090404 | A1 | 4/2010 | Krise |
| 2011/0095480 | A1 | 4/2011 | Berman et al. |
| 2011/0117980 | A1 * | 5/2011 | Parham ........................... 463/13 |

OTHER PUBLICATIONS

IGT, Double Draw Aces Poker, 2004, 2 pages.

King Show Games, Listing of Related Cases, Aug. 27, 2015, 1 page.

* cited by examiner

GAMING ACTIVITY AWARDING SUBSEQUENT PLAYS USING RESULTS OF PREVIOUS PLAYS

RELATED APPLICATIONS

This application is a continuation of U.S. application Ser. Nos. 13/525,322 filed on Jun. 17, 2012, now U.S. Pat. No. 8,758,110, which is a continuation-in-part of U.S. application Ser. No. 12/603,808, filed Oct. 22, 2009, now U.S. Pat. No. 8,202,150, both of which are incorporated herein by reference in their entirety.

FIELD

This invention relates in general to games, and more particularly to apparatuses and methods for wagering games that award subsequent plays using results of previous plays.

BACKGROUND

Casino games such as poker, slots, and craps have long been enjoyed as a means of entertainment. Almost any game of chance that can be played using traditional apparatus (e.g., cards, dice) can be simulated on a computer. The popularity of casino gambling with wagering continues to increase, as does recreational gambling such as non-wagering computer game gambling. It is also likely that most new games will be implemented, at least in part, using computerized apparatus.

One reason that casino games are widely implemented on computerized apparatus is that computerized games are highly adaptable, easily configurable and re-configurable, and require minimal supervision to operate. For example, the graphics and sounds included in such games can be easily modified to reflect popular subjects, such as movies and television shows.

Computer gaming devices can also be easily adapted to provide entirely new games of chance that might be difficult to implement using mechanical or discrete electronic circuits. Because of the ubiquity of computerized gaming machines, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill. In some jurisdictions, the absence of skill when determining awards during game play is a requirement.

The present disclosure describes methods, systems, and apparatus that provide for new and interesting gaming experiences, and that provide other advantages over the prior art.

SUMMARY

To overcome limitations in the prior art described above, and to overcome other limitations that will become apparent upon reading and understanding the present specification, the present invention is directed to an apparatus, system, computer readable storage media, and/or method that involve or otherwise facilitate dealing a first poker hand to a player from a first deck of playing cards. Additional changes to the first poker hand using the first deck of playing cards are made by the player to determine a payout on the first poker hand. If it is determined that a qualifying card combination is present in the first poker hand that allows the player to advance to play a second poker hand that includes the qualifying card combination, the second poker hand is dealt from a second deck of playing cards and includes the qualifying card combination. Additional changes to the second poker hand from the second poker hand are made by the player to determine a payout on the second poker hand.

In more particular embodiments, the additional changes to the first and second poker hands include drawing new cards to the first and second poker hands from the respective first and second decks of playing cards. In another more particular embodiment, the qualifying card combination includes a winning card combination.

In more particular embodiments, if second and subsequent qualifying card combinations are present in the second and subsequent poker hands, the subsequent poker hands continue to be dealt from third and subsequent decks of playing cards having the respective second and subsequent qualifying card combinations. In such a case, the first, second, and subsequent poker hands may be arranged as a rectangular grid, and each of the second, and subsequent poker may be are presented adjacent to a previously played hand as the respective second, and subsequent poker hands are being played.

In another embodiment of the invention, an apparatus, system, computer readable storage media, and/or method involves or otherwise facilitates playing a first hand of a card game from a first deck of playing cards to determine a first payout. Based on a qualifying card combination being present in the first hand, a second hand from is dealt from a second deck of playing cards. The second hand includes the qualifying card combination from the second deck and at least one randomly selected card from the second deck. The second hand of the card game is played to determine a second payout.

In more particular embodiments, the first and second hands include poker hands. In such a case, the first and second hands may include draw poker hands, and the determination of whether the qualifying card combination is present in the first hand may be performed after discarding cards and drawing new cards to the first hand.

In other more particular embodiments, the player is dealt additional first poker hands based on a common subset of held cards from the first poker hand. It is determined whether the qualifying card combination is present in the additional first poker hands that allows the player to advance to play additional second poker hands that respectively include the qualifying card combination. Based on the qualifying card combination being present in the additional first poker hands, the player is dealt the additional second poker hands from additional decks of playing cards. The additional second poker hands include the qualifying card combination. Additional changes to the additional second poker hands by the player are facilitated to determine a payout on the additional second poker hands.

In accordance with one embodiment, a processor-implemented method is provided that includes utilizing a processor (which includes any type of control circuitry) for dealing a first poker hand to a player via a display device. The method facilitates holding cards of the first poker hand, and utilizing the processor to present replacement cards via the display device for any of the cards that were not held in the first poker hand, thereby creating a first resulting poker hand. The cards of the first resulting poker hand are duplicated into a second poker hand, where cards in the second poker hand may again be held/discarded. The processor presents replacement cards via the display device for any of the cards that were not held in the second poker hand, thereby creating a second resulting poker hand.

In one particular embodiment, duplicating the first resulting poker hand into a second poker hand involves duplicating the first resulting poker hand into the second poker hand regardless of a poker rank of the first resulting poker hand. In another embodiment, duplicating the first resulting poker hand into a second poker hand involves duplicating the first resulting poker hand into the second poker hand without regard to any of the cards of the first resulting poker hand. In yet another embodiment, duplicating the first resulting poker hand into a second poker hand involves duplicating the first resulting poker hand into the second poker hand without qualification.

In other embodiments, such a method may further involve using the processor to determine whether payouts are to be awarded for the first and second resulting poker hands based on poker ranks of each of the first and second resulting poker hands relative to a poker rank paytable. Embodiments may also provide replacement cards for each respective poker hand from respective decks of playing cards, or in other embodiments from the same deck of playing cards.

In still other embodiments, such a method may be expanded to a greater number of poker hands. For example, such a method may further involve duplicating the second resulting poker hand into a third poker hand, facilitating one or more cards of the third poker hand to be held, and presenting replacement cards for any of the cards that were not held in the third poker hand to create a third resulting poker hand.

In still other embodiments, such a method may involve enabling any number (N) poker hands to be successively played, wherein the first, second and third poker hands represent the first of the N poker hands to be successively played, and where the method further involves duplicating a current resulting poker hand into a subsequent poker hand, facilitating one or more cards of the subsequent poker hand to be held, presenting replacement cards for any of the cards that were not held in the subsequent poker hand to create a corresponding subsequent resulting poker hand, and repeating the duplicating, holding and presenting of replacement cards until all N poker hands have been successively played.

In accordance with another embodiment, a computer-implemented gaming apparatus is provided that includes at least a display, a user interface, and a processor (which includes any one or more processors, controllers, etc.). The processor is configured to cause the apparatus to present a first poker hand to a player via a display device, hold between zero and all cards of the first poker hand as specified via the user interface, present replacement cards via the display device for any of the cards that were not held in the first poker hand to create a first resulting poker hand, determine a payout on the first resulting poker hand, duplicate all cards of the first resulting poker hand into a second poker hand, hold between zero and all cards of the second poker hand as specified via the user interface, present replacement cards via the display device for any of the cards that were not held in the second poker hand to create a second resulting poker hand, and determine a payout on the second resulting poker hand. The apparatus may be configured to analogously duplicate cards into third, fourth, or higher numbers of hands up to any number of hands desired.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system, apparatus, and method in accordance with the invention.

BRIEF DESCRIPTION OF THE DRAWINGS

The invention is described in connection with the embodiments illustrated in the following diagrams.

DETAILED DESCRIPTION

Figure 1:
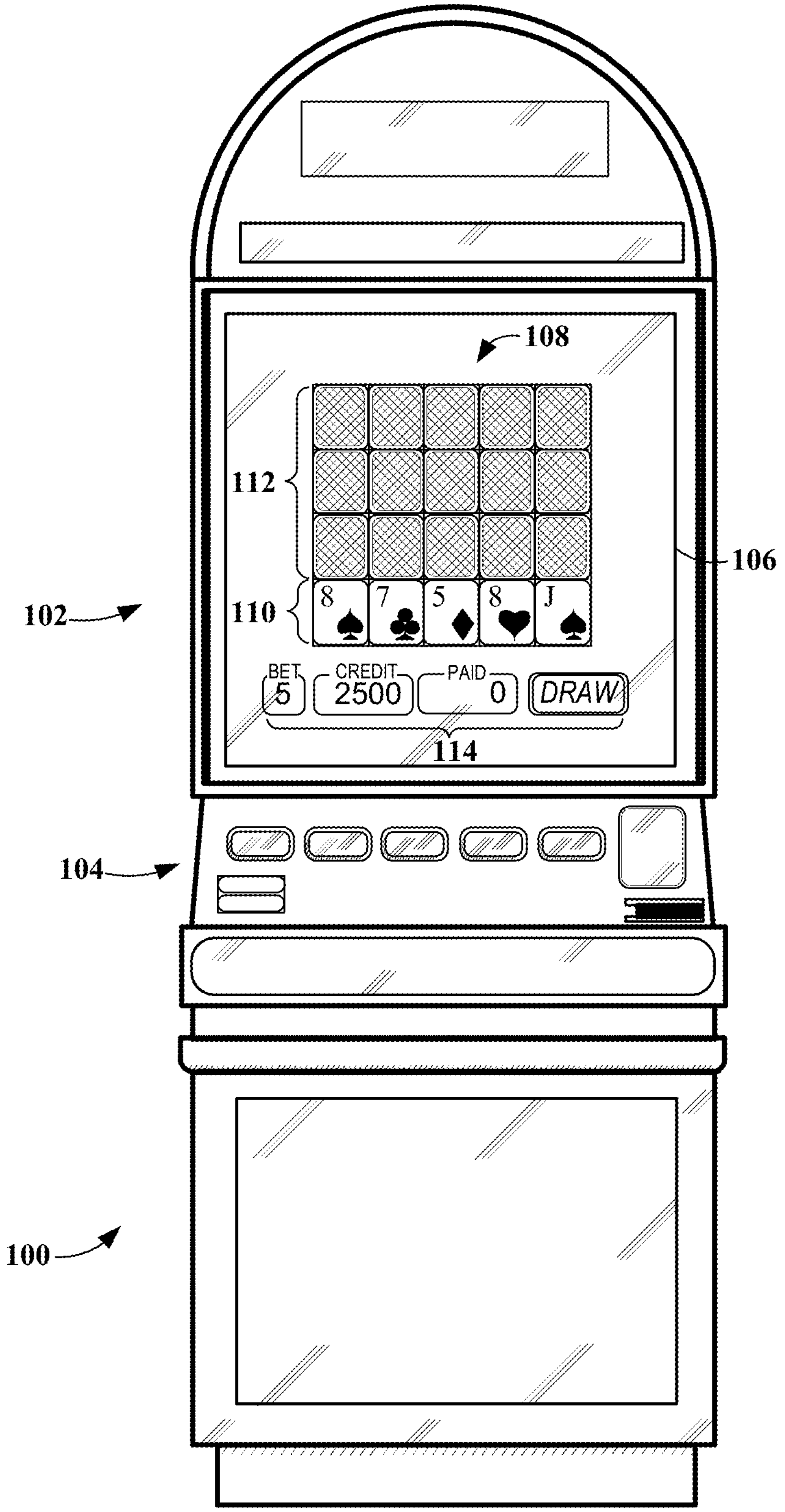
FIG. 1. is a diagram of a gaming machine according to an embodiment of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to a wagering game that may incorporate rules of existing turn-based games, e.g., gaming activities such as card games that provide payouts on individual turns or hands. In such a game, a winning combination of one turn or hand can be incorporated (e.g., copied) into a subsequent turn or hand. In one example embodiment, a gaming method or apparatus my take the form of five-card single draw poker game with feature that allow the player to use the qualifying results from the previous hand to be used on successive hands. For example, the player may need to qualify with a winning combination of a pair of Jacks or better on the first hand in order to play subsequent hands. In such an example, a winning combination of a pair of Queens would qualify and the two Queens would be moved in to a subsequently dealt hand, to which the player is dealt three additional cards. All or some of these cards can be discarded per the rules of draw poker, and another draw occurs for another opportunity to improve the hand. Each hand in this example would use a separate fifty-two card, e.g., the carried over cards would first be removed from the new deck, and there is a chance that card that were not carried over from the first hand may be dealt again in subsequent hands. In other embodiments, replacement cards may be dealt from the same deck from which the initial hand was dealt.

In the description that follows, the term "cards," "decks," and similar mechanically descriptive language may be used to describe various apparatus presentation features, as well as various actions occurring to those object (e.g., "draw," "hold," "bet"). Although the present disclosure may be applicable to both to manual, mechanical, and computerized embodiments, and any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., holding, drawing, betting). Further, the computerized version may provide the look of mechanical equivalents but may be generally randomized in a different way. Thus, the terms "cards," "decks," "reels," "hands," etc., are intended to describe both physical objects and emulation or simulations of those objects and their behaviors using electronic apparatus.

In various embodiments of the invention, the gaming displays are described in conjunction with the use of data in the form of "symbols." In the context of this disclosure, a "symbol" may generally refer at least to a collection of one or more arbitrary indicia or signs that have some conventional significance. In particular, the symbol represents values that can at least be used to determine whether to award a payout. A symbol may include numbers, letters, shapes, pictures, textures, colors, sounds, etc., and any combination therebetween. A win can be determined by comparing the symbol with another symbol. Generally, such comparisons can be performed via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

In reference now to FIG. 1, a gaming machine 100 is illustrated that provides a gaming experience according to an embodiment of the invention. The illustrated gaming machine 100 may include a computing system (not shown) to carry out operations according described herein. The gaming machine 100 includes a display 102, and a user interface 104, although some or all of the user interface 104 may be provided via the display 102 in touch screen embodiments. The user interface 104 allows the user to control and engage in play of the gaming machine 100. The particular user interface mechanisms included with user interface 104 may be dependent on the type of gaming machine. For example, the user interface 104 may include one or more buttons, switches, joysticks, levers, pull-down handles, trackballs, voice-activated input, or any other user input system or mechanism that allows the user to play the particular gaming activity.

The user interface 104 may allow the user to enter coins, bills, or otherwise obtain credits through vouchers, tokens, credit cards, tickets, etc. Various mechanisms for entering such vouchers, tokens, credit cards, coins, tickets, etc. are known in the art. For example, coin/symbol input mechanisms, card readers, credit card readers, smart card readers, punch card readers, radio frequency identifier (RFID) readers, and other mechanisms may be used to enter wagers. It is through the user interface 104 that the user can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The display device 102 may include one or more of an electronic display, a mechanical display, and fixed display information such as information such as paytable information associated with a glass/plastic panel on the gaming machine 100. The symbols or other indicia associated with the play of the game may be presented on an electronic display device. Generally, the display 102 devotes the largest portion of viewable area to the primary gaming portion 106. The gaming portion 106 is generally where the visual feedback for any selected game is provided to the user. The gaming portion 106 may render graphical objects such as cards, slot reels, dice, animated characters, and any other gaming visual known in the art. The gaming portion 106 also typically informs players of the outcome of any particular event, including whether the event resulted in a win or loss.

In some the example embodiments illustrated herein, the gaming portion 106 may display a grid 108 (or equivalent arrangement) of playing cards. The grid 108 includes rows (or equivalent arrangements) that each represent a play event. For example, the illustrated gaming portion 106 is dedicated to video poker, so each row of the grid 108 represents a hand of poker. For each hand, the machine 100 may deal five cards, allow the user to select which cards to hold, deal replacements for the cards not held, and determine a payout based on the final cards in the hand. The illustration and description of five-card-draw poker is for purposes of example and not of limitation; the present invention may be applicable to numerous other card games, as well as other types of gaming activities and apparatuses, such as slot machines, dice, coins, etc.

In the illustrated grid 108, the hand being currently played is shown in row 110. Additional rows 112 represent hands that may subsequently be played if the final state of the current hand 110 meets some minimum qualifying card combination (e.g., pair of Jacks). The rows 112 are played from bottom to top of the grid 108. The illustrated arrangement and order of play is only one possible example; hands may be played from top to bottom, and/or the hands may be arranged as columns, and the subsequent hands played right-to-left or left-to-right. In the latter case, the grid 108 may include five rows so that each column would be able to represent a five card poker hand. Additional details of the operation of the grid 108 will be described further hereinbelow in relation to FIGS. 2 and 3.

The gaming portion 106 may include other features known in the art that facilitate gaming, such as status and control portion 114. As is generally known in the art, this portion 114 provides information about current bets, current wins, remaining credits, etc. associated with gaming activities of the grid 108. The control portion 114 may also provide touch-screen controls for facilitating game play. The grid 108 may also include touchscreen features, such as facilitating selection of individual cards for holding prior to draw of new cards and/or advancing particular cards to move up to the next hand if conditions are satisfied. The gaming portion 106 of the display 102 may include other features that are not shown, such as paytables, navigation controls, etc.

Figure 2:
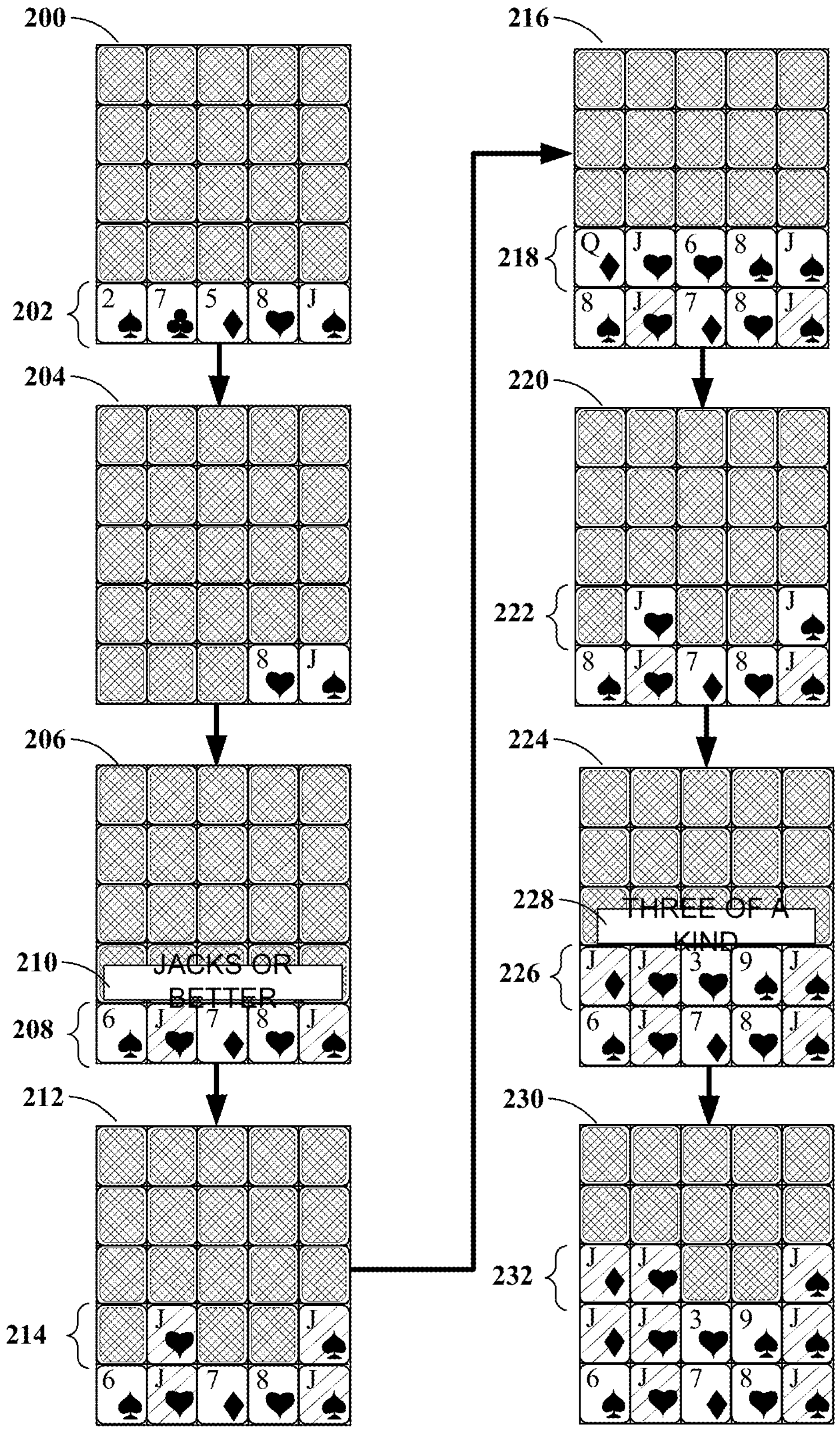
FIG. 2 is a diagram showing a sequence of gaming screens according to an embodiment of the invention.

An example of how game play may proceed according to one embodiment of the invention is shown in the sequence diagram of FIG. 2. This sequence diagram illustrates various game play states or screens that might be seen in a gaming apparatus according to embodiments of the invention. Screen 200 shows a grid of cards such as grid 108 shown and described in the discussion of FIG. 1. Row 202 shows the initial deal of a five card draw hand. In screen 204, the player has held two cards (an eight and a Jack) and three more cards are dealt to form the hand 208 that is shown in screen 206.

The hand 208 includes a pair of Jacks, which by itself may result in a pay out to the player based on predetermined pay tables. Further, as indicated by text 210, the pair of Jacks meets the minimum combination needed to advance to the next row, which is shown in screen 212 as hand 214. The winning combination of the pair of Jacks has been moved up to the hand 214, and as shown in screen 216, additional cards are dealt to form new hand 218. In this embodiment, the newly dealt hand 218 is determined as if a new deck of cards was shuffled, and the two Jacks from the previous hand (Jack of hearts and Jack of spades in this example) are taken from the deck and dealt first. As a result, a card that was dealt in a previous hand but not moved up (e.g., six of spades in hand 208) may be dealt in a subsequent hand (e.g., hand 218). In other embodiments, the additional cards dealt into, for example, hand 218 are dealt from the same deck that was used to deal the original hand 202, with the exception of the cards that are moved up from hand 202 to hand 218 (e.g., pair of Jacks).

Per standard rules of draw poker, the user may select cards to hold in this new hand and the other cards are discarded, as seen in row 222 of screen 220. As seen in hand 226 of screen 224, replacements are dealt to replace the discards. In this hand 226, the player has been dealt another Jack, thus earning a payout for three of a kind as indicated by text 228. Because three of a kind meets the minimum conditions for continuing, the three Jacks are moved up to the next row 232, as seen in screen 230. A similar sequence of re-dealing, draw, and payout are repeated in a similar manner, as seen in screens 300, 302, 304, 306, and 308 of FIG. 3. Such sequence of events may continue for at least as long as final hands meet the minimum conditions, as may be contingent on other events and conditions (e.g., user selection, user wager, maximum number of rows, etc.).

The illustrated sequence of FIG. 2 is exemplary, and many variations are possible in light of these teachings. For example, the game may provide any number of next playable hands, either a predetermined maximum number as shown by the five rows in FIG. 2, and/or based on some rules involving the hands in play. For example, the game could allow additional subsequent hands so long as the subsequent hand "beats" the previous hand. For example, subsequent hand 226 in FIG. 2 would beat hand 208 (three of a kind beats a pair) in multiplayer poker, so based on that (and not necessarily on the minimum required pair of Jacks or better) the player may advance to the next level of play seen in screen 230.

A similar alternate requirement is that the subsequent hand represents a different kind of hand on successive hands (e.g., pair of Queens may be considered same "kind" of hand as a pair of Jacks). This may not require that the subsequent hand beat the previous hand. For example, the player may try for any other different type of hand in the subsequent hand, whether better or worse than the preceding hand, e.g., moving up one or two cards from a straight in the hopes of getting a pair of Jacks or better in a subsequent hand, and thereby being allowed to continue playing. It will be appreciated that the game may require at least a minimum of two related hands, because in such a game a subsequent hand depends on (and incorporates) the results of a previously played hand.

In another variation, the game may only allow a certain number of cards of the winning combination to be moved up to the next hand. For example, even though hand 226 includes three Jacks, the game rules, e.g., fixed in advance or based on amount or kind of wager, may only allow moving two of the Jacks to the next hand. This could be combined with the features above, e.g., the player may only be awarded for improvements or a different kind of hand on successive hands. In another variation, the player may not be allowed to perform a draw with a hand that starts with the results of the previous hand. In such a case, the qualifying combination is moved up to a new hand (where it is taken from a new deck), new cards are dealt from the new deck to fill out the hand, and a payout is then determined directly from that deal without the player holding and drawing new cards.

In other variations, the player may be given a choice as to whether or not they want the results from a played hand to be moved up. This choice could be one of whether the player advances at all, and/or which cards from the prior hand would advance. For example, if the hand 208 instead included an eight of spades, nine of spades, ten of spades, Jack of spades, and Jack of hearts, the player instead may opt to select all of the cards except the Jack of hearts in the hopes of drawing a straight, flush, or straight flush in the next hand. In this case, such user selection may be allowed so long as at least one card from the winning combination is carried over to the next hand.

In another variation, all the cards except the winning combination may be carried up to the next hand. So, for example, in the resulting hand 208 seen in FIG. 2, the six, seven, and eight might be moved up instead of the pair of Jacks. In such a case, even though the pair of Jacks triggers the qualification, the actual qualifying combination includes cards that are not included in those triggering cards. In some embodiments, the user may have an option to select either the winning combination up (e.g., pair of Jacks) or the other cards to be moved up to the next hand.

The examples above have described a "Jacks or better" condition in which a minimum paying combination can be moved up. The feature could be modified to raise the minimum qualifier for moving hands up, e.g., flushes or higher. In some variations this bar could also be lowered, e.g., to only allow players who end up with poor or losing hands, such as less than a pair of Jacks, to try again with some or all of the previously played cards. In some variation, the player could wager more in order to change the criteria for what hands are allowed to be moved up to subsequent hands.

The features described herein, e.g., awarding subsequent plays using results from previous plays, could be applied to other card games such as a stud poker, hold-em, hi-lo, blackjack, etc., or any other game of chance where a number of symbols, tokens, or the like are used in pattern matching to determine a winning outcome. For example, this type of game play could be applied to a slot game where the player can hold symbols in a winning combination and the remaining un-held symbols can be spun again.

The above described embodiments are generally applicable to any kind of chance-based wagering gaming methods or apparatus. As such, there are many variations on how players may place wagers. In the example of FIG. 2, the player may pre-pay for the five hands, and/or wager an additional bonus bet to cover the feature. Another way that betting could occur is to charge the player additional credits on a hand-by-hand basis if they are starting a hand using the cards from the previously played hand.

Similarly, there are many variations on how players may receive payouts. For example, each hand may be paid out from a standard paytable as if there were no linkages between subsequent hands. In other examples, the values/multipliers of the paytable may increase or decrease for subsequent related hands. In either case, there would be an independent payout determination for each hand that the user is offered and/or elects to play. The statistical basis for awarding per-hand payouts for known card games are known in the art, and as such are not discussed here further.

In some variation, there could also be other payouts (e.g., primary payouts or bonuses) based on combinations of the multiple hands. For example, in one variation described above, a subsequent hand using some of the previous cards may be awarded if the current hand meets some minimum criteria and is different than a previously awarded hand. In such a case, if a player manages to be awarded some number of these hands, then this even by itself would trigger a bonus award. Using individual five-card draw as an example, the player could be awarded a "perfect square" bonus based on the first hand and each of the subsequent hands (each of the latter formed using selected cards from the previous hand) conforming to some combination of paytable categories, e.g., Jacks or better, two pair, three of a kind, straight, flush, four of a kind, straight flush, and royal flush.

Other combinations of final hands may also be used to determine primary or bonus payouts. For example, if the player completes five different hands in the grid shown in FIG. 2, and additional payline-type bonus may be awarded, e.g., for matching any one of card value or suit along a predetermined line (e.g., horizontal, vertical, diagonal). In the example of FIG. 2, the player could achieve such a result by simply holding on to the two Jacks in hand 208 for all subsequent hands (assuming such choice is under player control) to form two vertical lines of matching Jacks. In such a case, to provide reasonable house odds, such paylines may be limited to certain categories of cards, e.g., cards not moved up in the same column to subsequent hands. In another variation, positions of cards within subsequent hands may be randomized to prevent players from forming payout lines and receiving awards without some element of chance.

Figure 4:
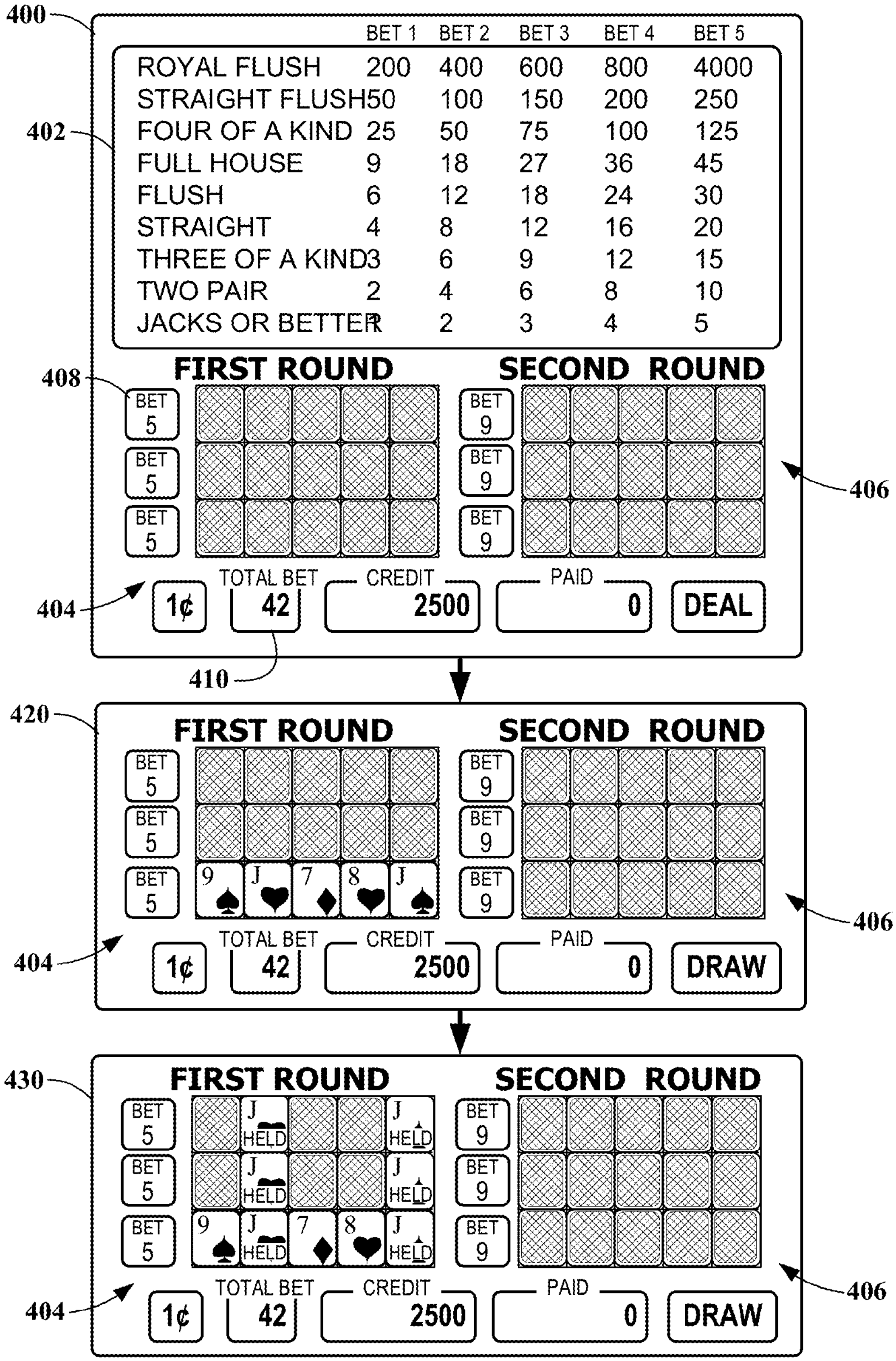
FIG. 4 is a diagram showing a sequence of gaming screens according to an alternate embodiment of the invention.
Figure 5:
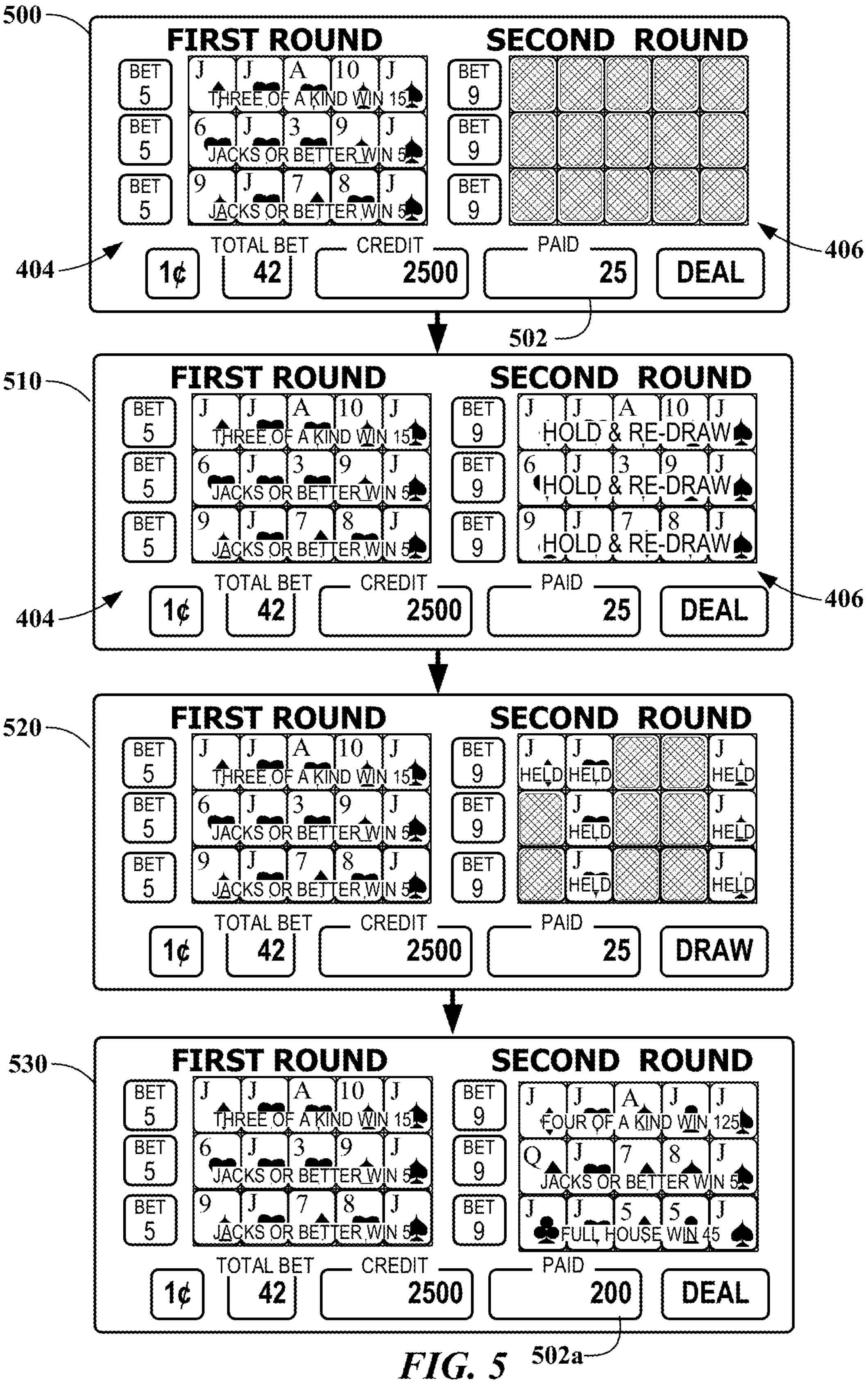
FIG. 5 is a sequence diagram showing a continuation of the gaming screen sequence from FIG. 4.

In reference now to FIGS. 4 and 5, an embodiment is described wherein the poker game concept described above can be applied to an alternate style of game play. Generally, the alternate style of game play allows a player to hold card from a first poker hand, and have the held cards "copied" into additional hands (e.g., two more hands). All the hands are then played simultaneously, e.g., each hand being dealt with additional cards dealt to fill out the hands. The player has the opportunity to win independently from each hand. In the embodiment shown in FIGS. 4 and 5, the player plays this alternate game (referenced hereinbelow as the "First Round" of play) and once completed has the opportunity to improve each of these hands through the features described above (referenced hereinbelow as the "Second Round" of play).

An example screen 400 in FIG. 4 illustrates some components that may be seen in a computer-implemented version of this game embodiment. A paytable 402 lists payouts based on the amount bet on each hand. In this example, the paytable 402 does not change during the sequence, and so the paytable 402 will be omitted from subsequent screens in order to improve readability. The screen 402 also generally includes a first portion 404 for First Round hands and a second portion 406 for Second Round poker hands. A number of betting input components (as represented by component 408) allows setting and viewing the bets on each of the hands. In this example, the player has bet 5 coins on each of the First Round hands in portion 404, and 9 coins on each of the Second Round hands in portion 406. These additional 9 coins improve each First Round hand result through the Second Round feature. As seen in indicator 410, the total of all of these bets is 42 coins.

Screens 420 and 430 in FIG. 4, and screen 500 in FIG. 5 illustrate a game play sequence as the player plays First Round poker represented on the left portion 404 of the screens. In screen 420, the initial hand is dealt. In screen 430, the player holds cards from the initial deal, and the held cards are duplicated to two more hands directly above the dealt hand, giving the player a change to draw individually to each First Round hand. In screen 500 of FIG. 5, cards are drawn to each First Round hand and the player is paid according to paytable 402 for winning combinations in each of the three hands. This payout amount is shown in indicator 502.

Once this hand seen in screen 500 is completed, each final hand result from the First Round side 404 is duplicated to Second Round section 406, where the player has to opportunity to hold any cards and redraw to improve the hands. As seen in screen 510, the results of each First Round hand is duplicated to the right section 406 of the screen, where the player may be allowed to hold any of the cards and redraw utilizing the Second Round feature. As seen in screen 520, the player holds cards from the Second Round section and a draw occurs. New cards are drawn to each Second Round hand as seen in screen 530, where the player is paid for any winning combinations on the Second Round hand and the game ends. Note that screen 530 includes an update to payout as seen in indicator 502*a* to reflect the total of both the First Round and Second Round win amounts.

Figure 3:
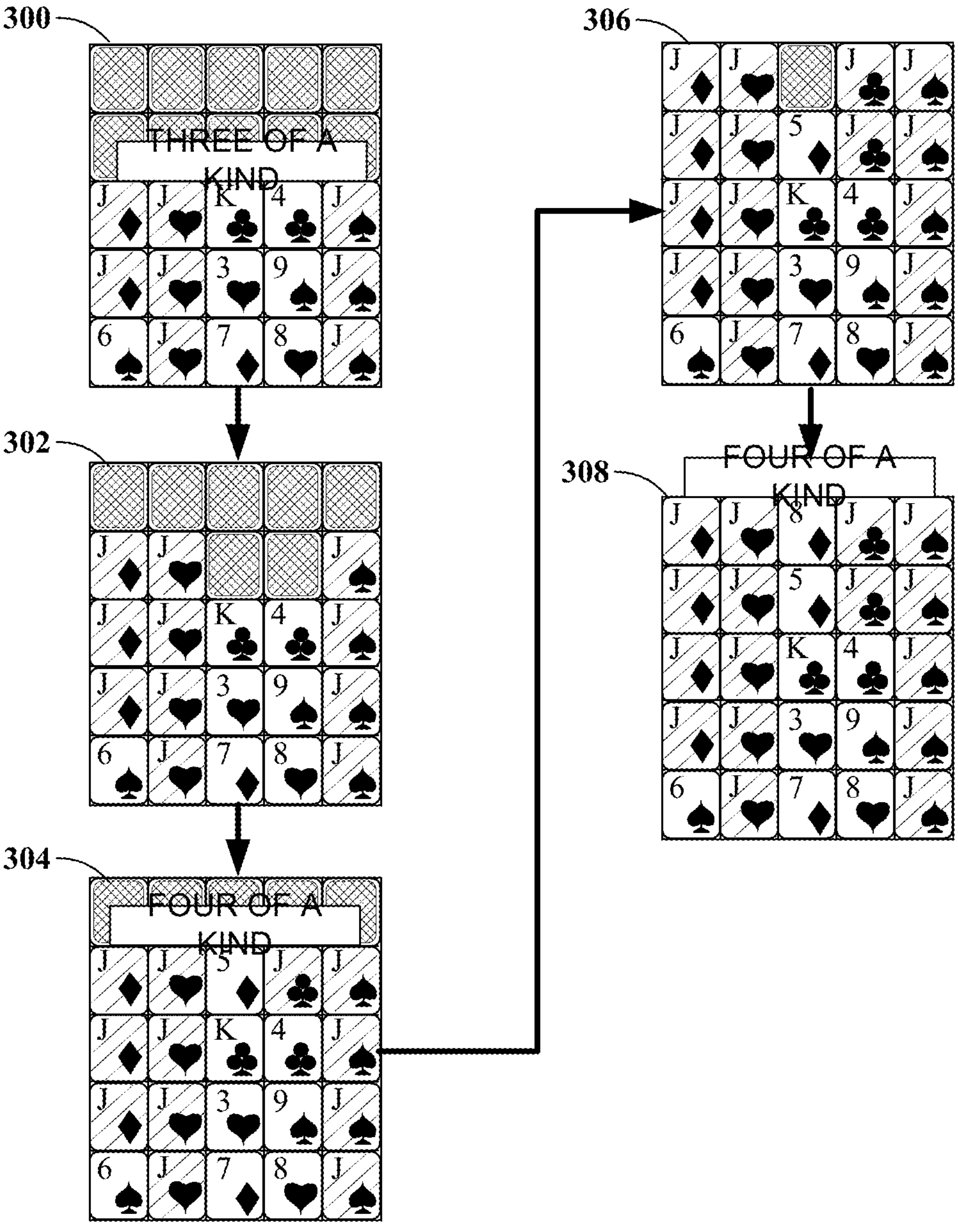
FIG. 3 is a diagram showing a continuation of the gaming screen sequence from FIG. 2.

It will be appreciated that many variations are possible in view of the examples shown in FIGS. 4 and 5. For example, the preceding example depicts three hands of First Round, however this idea could be applied to any number of First Round style hands, such as Fifty and Hundred Play. The preceding examples depict one hand of Second Round for each First Round Hand, and this could be changed to include different numbers of Second Round hands relative to First Round hands. For example, the player may be able to continue moving hands up multiple times, such as is depicted in FIGS. 2 and 3, thereby increasing the chances to improve previous hands. Similarly, the player may be able to select just a subset of the First Round hands for entry into the Second Round phase of play.

In some variations, the ability to move hands from the First Round portion 404 to the Second Round portion 406 may also depend on the resultant First Round hand satisfying a predetermined condition, such as Jacks or better. So if particular ones of the resulting First Round hands (e.g., at a game state as shown in screen 500) did not result in Jacks or better, then those particular hands would not be carried over to the right hand side 406, even if the players paid bets on the right portion 406 of the screen for those hands. If there was an analogous requirement for the First Round hands (e.g., player could only duplicate held cards such as in screen 430 if the held cards were Jacks or better, for example), then such 'filtering' would already have taken place at the left portion 404 of the screen for all but the initial hand. However, even if the held cards did not satisfy the First Round requirements in such a variation, the final hand (e.g., after the draw) might still satisfy the requirement for Second Round, allowing the player to at least move that one hand to the right portion 406.

It will be appreciated that the variations described in relation to FIGS. 2 and 3 regarding what cards may be carried over, how betting may occur, etc., are equally applicable to the examples in FIGS. 4 and 5. For example the play screen may keep shifting to the left (e.g., revealing a new Second Round portion 406 on the right of the screen) so long as one or more previous Second Round hands meet a predetermined criteria (e.g., beats the previous hand directly to its left and/or any other hand on the left, presents a different winning combination than the card directly to the left and/or different than all other hands on the left, etc.).

Figure 6:
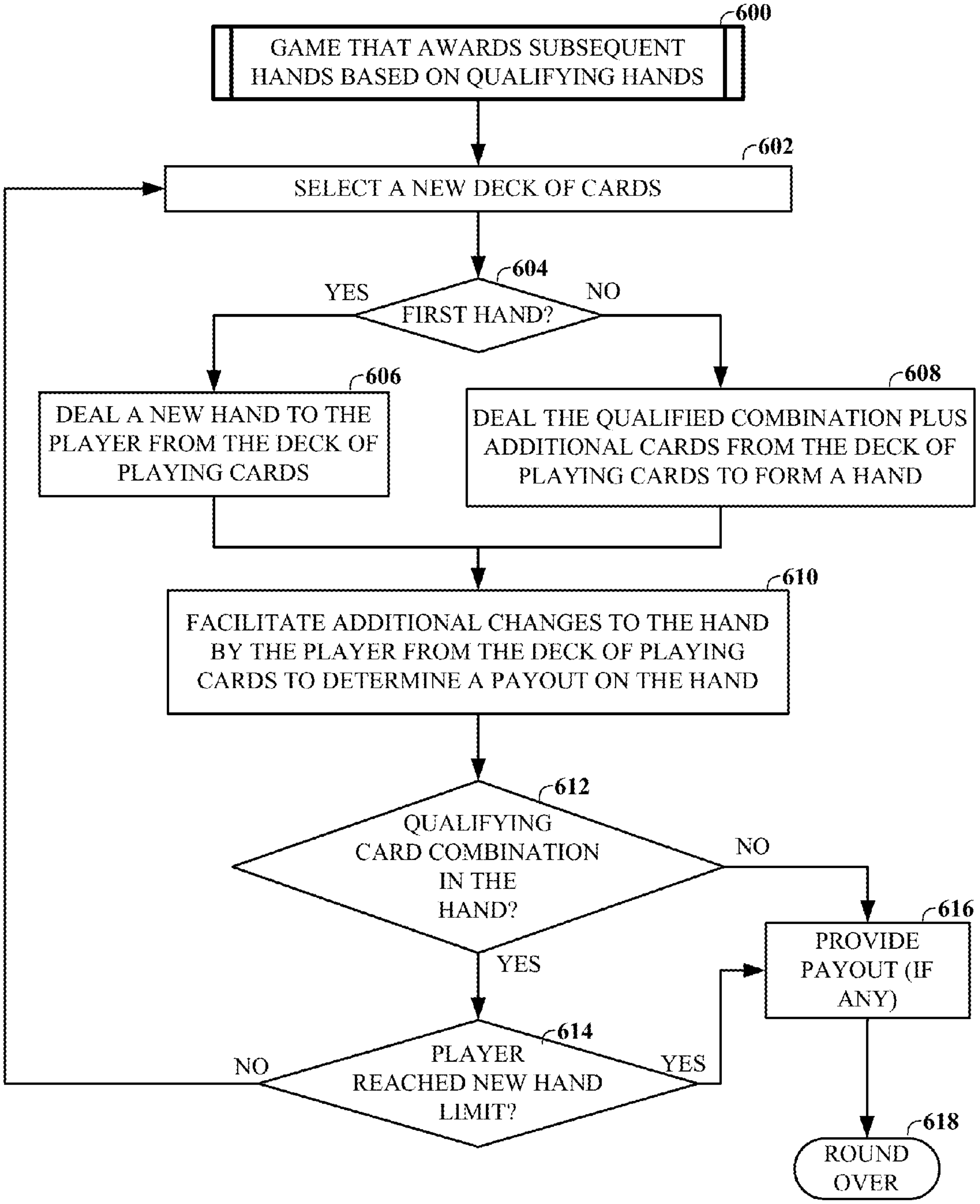
FIGS. 6 and 7 are flowcharts illustrating a gaming procedure according to an embodiment of the invention.

In reference now to FIG. 6, an example procedure 600 is illustrated for providing a gaming experience according to embodiments of the invention. In the illustrated embodiment, a new deck of cards is selected 602 for each hand. In computerized games, this selection 602 may involve randomly arranging a collection of data objects each representing a playing card. It is next determined 604 whether this is the first hand of the round. Generally, a "round" in this context refers to a sequence that involves dealing a hand to one or more players, making changes to a hand (e.g., discarding and drawing new cards), and determining a win. The round generally ends with the player leaving, a new hand being dealt that is unrelated to the previous hand, or some other event of significance in the game, e.g., an initial or ante bet.

If this is the first hand of the round, then a new hand of cards is dealt 606 to the player in the normal fashion. However, if this hand includes a combination of cards carried over from a previous hand (here designated as a "qualified combination"), then the qualified combination (or some combination thereof) is dealt 608 to the player, along with additional cards from the new deck to fill out the hand. It will be appreciated that, because a new deck was previously selected 602, the qualified combination will first be extracted from the new deck before dealing these additional cards.

After the player has the initial hand 606 or 608, the game may facilitate making one or more changes 610 to the hand from the selected deck of playing cards. Such changes 610 typically include dealing new cards, discarding, and or rearranging cards as allowed by the rules of the underlying card game. Generally, such changes 610 will result in a configuration where a payout may be determined, although not necessarily provided at this stage. At this point, it may also be determined 612 whether the resulting hand includes a qualifying combination such as described hereinabove (e.g., Jacks or better).

If there is a qualifying combination, a determination 614 may also be needed to determine whether there has been some limit on the number of new hands that can be dealt using cards from previous hands. Examples if this are discussed above in greater detail, such as a fixed amount, various combinations of hands, etc. If such a limit has not been reached, then a new deck of cards can be selected 602 and the process repeats as described above.

If the hand resulting from action(s) 610 do not result in a qualifying combination, or if a limit on new hands have been reached, then a payout may be provided 616, and the round is complete 618. It will be appreciated there may be many variations on this procedure 600. For example, incremental payouts may be made to the player, e.g., as part of determinations made at 610. Other events not shown (e.g., additional wagers, side bets, etc.) may also be included as part of game play during one or more of the illustrated steps.

Figure 7:
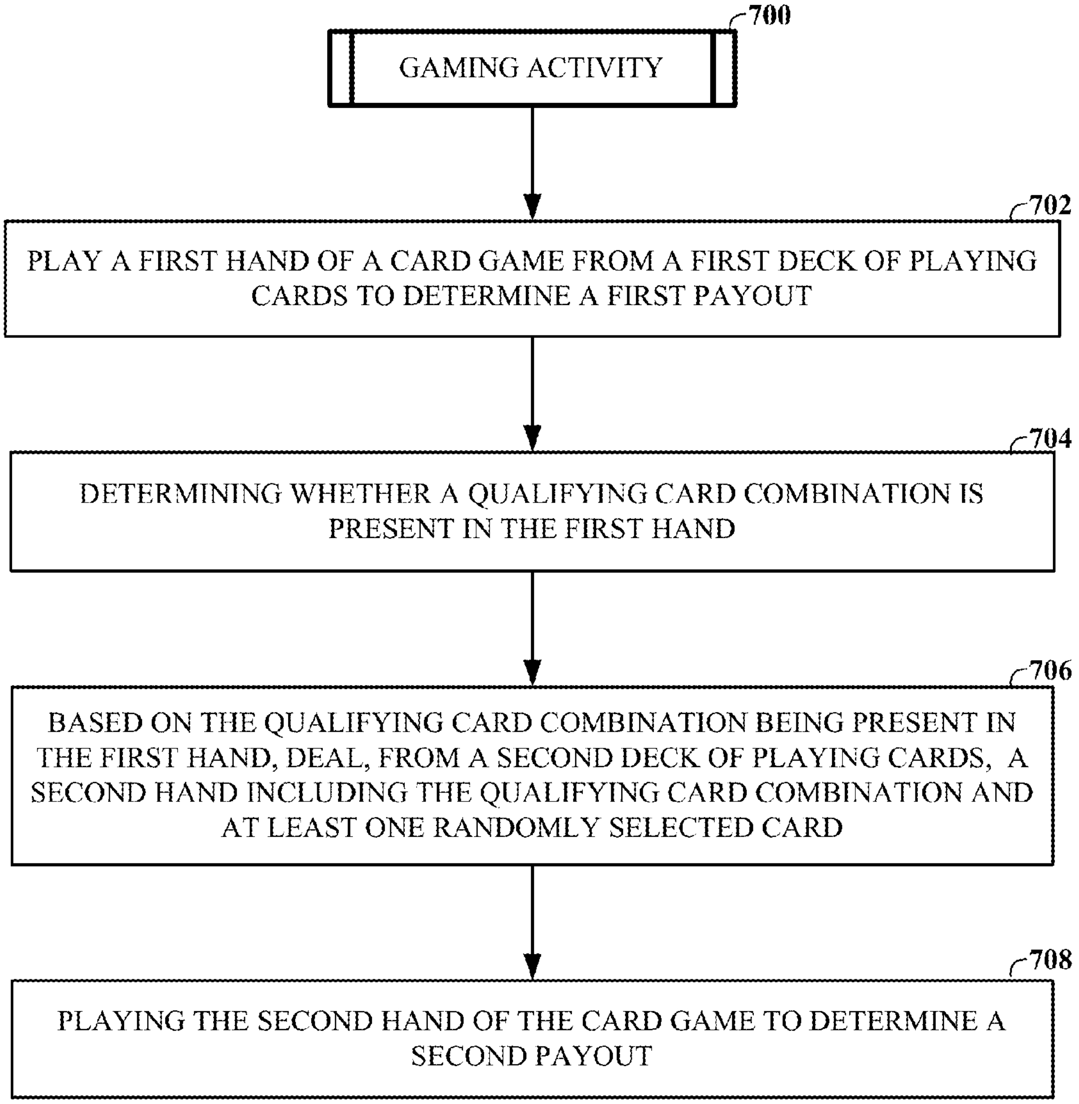

In reference now to FIG. 7, another example procedure 700 is illustrated for providing a gaming experience according to embodiments of the invention. The procedure involves playing 702 a first hand of a card game from a first deck of playing cards to determine a first payout and determining 704 whether a qualifying card combination is present in the first hand. If the qualifying card combination is present in the first hand, a second hand is dealt 706 from a second deck of playing cards. The second hand includes the qualifying card combination from the second deck and at least one randomly selected card from the second deck. The second hand of the card game is played 708 to determine a second payout.

Figure 8:
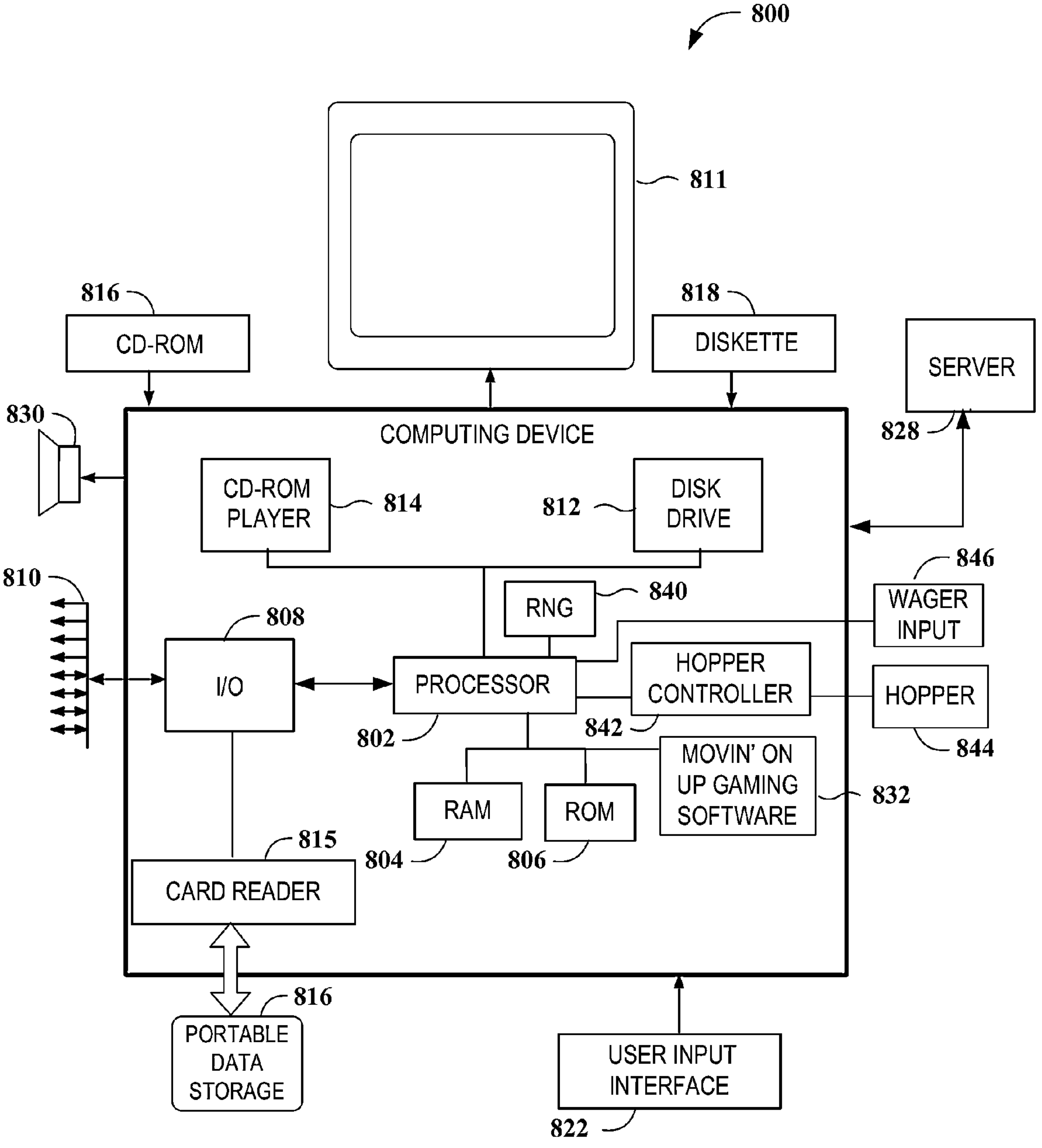
FIG. 8 is a block diagram illustrating a computing arrangement according to an embodiment of the invention.

As may now be readily understood, one or more devices may be programmed to play various embodiments of the invention. The present invention may be implemented as a casino gaming machine or other special purpose gaming kiosk as described hereinabove, or may be implemented via computing systems operating under the direction of local gaming software, and/or remotely-provided software such as provided by an application service provider (ASP). The casino gaming machines utilize computing systems to control and manage the gaming activity. An example of a representative computing system capable of carrying out operations in accordance with the invention is illustrated in FIG. 8.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 800 of FIG. 8 is an example computing structure that can be used in connection with such electronic gaming machines, computers, or other computer-implemented devices to carry out operations of the present invention.

The example computing arrangement 800 suitable for performing the gaming functions in accordance with the present invention typically includes a central processor (CPU) 802 coupled to random access memory (RAM) 804 and some variation of read-only memory (ROM) 806. The ROM 806 may also represent other types of storage media to store programs, such as programmable ROM (PROM), erasable PROM (EPROM), etc. The processor 802 may communicate with other internal and external components through input/output (I/O) circuitry 808 and bussing 810, to provide control signals, communication signals, and the like.

The computing arrangement 800 may also include one or more data storage devices, including hard and floppy disk drives 812, CD-ROM drives 814, card reader 815, and other hardware capable of reading and/or storing information such as DVD, etc. In one embodiment, software for carrying out the operations in accordance with the present invention may be stored and distributed on a CD-ROM 816, diskette 818, access card 819, or other form of computer readable media capable of portably storing information. These storage media may be inserted into, and read by, devices such as the CD-ROM drive 814, the disk drive 812, card reader 815, etc. The software may also be transmitted to the computing arrangement 800 via data signals, such as being downloaded electronically via a network, such as the Internet. Further, as previously described, the software for carrying out the functions associated with the present invention may alternatively be stored in internal memory/storage of the computing device 800, such as in the ROM 806.

The computing arrangement 800 is coupled to the display 811, which represents a display on which the gaming activities in accordance with the invention are presented. The display 811 represents the "presentation" of the video information in accordance with the invention, and may be any type of known display or presentation screen, such as LCD displays, plasma display, cathode ray tubes (CRT), digital light processing (DLP), liquid crystal on silicon (LCOS), etc.

Where the computing device 800 represents a stand-alone or networked computer, the display 811 may represent a standard computer terminal or display capable of displaying multiple windows, frames, etc. Where the computing device is embedded within an electronic gaming machine, the display 811 corresponds to the display screen of the gaming machine/kiosk. A user input interface 822 such as a mouse, keyboard/keypad, microphone, touch pad, trackball, joystick, touch screen, voice-recognition system, etc. may be provided. The display 811 may also act as a user input device, e.g., where the display 811 is a touchscreen device.

Chance-based gaming systems such as slot machines, in which the present invention is applicable, are governed by random numbers and processors, as facilitated by a random number generator (RNG). The fixed and dynamic symbols generated as part of a gaming activity may be produced using one or more RNGs. RNGs as known in the art may be implemented using hardware, software operable in connection with the processor 802, or some combination of hardware and software. The present invention is operable using any known RNG, and may be integrally programmed as part of the processor 802 operation, or alternatively may be a separate RNG controller 840.

The computing arrangement 800 may be connected to other computing devices or gaming machines, such as via a network. The computing arrangement 800 may be connected to a network server 828 in an intranet or local network configuration. The computer may further be part of a larger network configuration as in a global area network (GAN) such as the Internet. In such a case, the computer may have access to one or more web servers via the Internet. In other arrangements, the computing arrangement 800 may be configured as an Internet server and software for carrying out the operations in accordance with the present invention may interact with the player via one or more networks.

Other components directed to gaming machine implementations include manners of gaming participant payment, and gaming machine payout. For example, a gaming machine including the computing arrangement 800 may also include a hopper controller 842 to determine the amount of payout to be provided to the participant. The hopper controller may be integrally implemented with the processor 802, or alternatively as a separate hopper controller 842. A hopper 844 may also be provided in gaming machine embodiments, where the hopper serves as the mechanism holding the coins/tokens of the machine. The wager input module 846 represents any mechanism for accepting coins, tokens, coupons, bills, electronic fund transfer (EFT), tickets, credit cards, smart cards, membership cards, etc., for which a participant inputs a wager amount. It will be appreciated that the primary gaming software 832 may be able to control payouts via the hopper 844 and controller 842 for independently determined payout events.

Among other functions, the computing arrangement 800 provides an interactive experience to players via input interface 822 and output devices, such as the display 811, speaker 830, etc. These experiences are generally controlled by gaming software 832 that controls a primary gaming activity of the computing arrangement 800. The gaming software 832 may be temporarily loaded into RAM 804, and may be stored locally using any combination of ROM 806, drives 812, media player 814, or other computer-readable storage media known in the art. The primary gaming software 832 may also be accessed remotely, such as via the server 828 or the Internet.

The primary gaming software 832 in the computing arrangement 800 is shown here as an application software module. According to embodiments of the present invention, this software 832 provides a card game or similar game of chance as described hereinabove. For example, the software 832 may present, by way of the display 811, representations of playing cards or other symbols to deal a first hand of a card game is from a first deck of playing cards to determine a first payout. If a qualifying card combination is present in the first hand, a second hand is dealt from a second deck of playing cards. The second hand includes the qualifying card combination from the second deck and at least one randomly selected card from the second deck. The second hand of the card game determines a second payout. The software 832 may include instructions to provide other functionality as known in the art and described herein, such as shown and described above regarding FIGS. 1-7.

The gaming methods and devices described herein include games that enable the player to move resulting hands into subsequent hands to begin play of those subsequent hands. For example, a first hand of draw poker can be played out, and when the resulting hand is derived through possible holding and replacement of cards, that resulting hand can serve as the initially dealt hand of a second hand of draw poker. If more than two hands are being played, the second hand can be modified through possible holding/drawing, and the resulting second hand can then serve as the initially dealt hand of a third hand of poker. This can continue up to N hands of cards, where each successively played hand (except the first hand) begins with the resulting hand of its preceding hand. The number of hands being played may be designed into the game, may be random, may be based on the number of credits or other player assets played by the player, and/or any other criteria established for participating in multiple hands.

An apparatus facilitating such an embodiment may be analogous to those described in connection with at least FIGS. 1 and 8. A computer-implemented gaming apparatus capable of carrying out such an embodiment may include, for example, a display, a user interface, and a processor configured to cause the apparatus to perform various functions. Such functions may include, for example, presenting a first poker hand to a player via the display device, enabling the player to hold some number of cards (e.g. between none of the cards and all of the cards) of the first poker hand, and presenting replacement cards for any of the cards that were not held in the first poker hand to create a first resulting poker hand. Further, the cards of that first resulting hand are duplicated into a second poker hand, where some number of cards (e.g. between none of the cards and all of the cards) may be held. Cards to replace those not held in this second poker hand are presented in order to create a second resulting poker hand. In this manner, the second poker hand begins with the result of the first draw poker hand, thereby enabling resulting hands to be duplicated in their entirety for repeated wins or to otherwise attempt to improve the prior resulting hand(s).

Each resulting hand may be analyzed to determine whether it meets any payout criteria on a paytable or other payout reference. It should be noted that the player may hold cards directly, or other manners of holding cards may be implemented such as utilizing an automatic hold feature that holds cards on behalf of the user.

Additionally, some embodiments involve proceeding to the next level without regard to the cards, poker rank and/or other characteristics of the hand that is being duplicated. For example, in a game involving play of two hands, all five cards of the resulting first poker hand (after hold/draw) may be duplicated into the five card positions of the second poker hand. In this manner, the second poker hand is effectively dealt by way of duplication of the result of the first draw poker hand, without qualification requirements to play the second hand. In other embodiments, some qualification criteria of the first hand may be involved to be allowed to play the second hand.

While the above example describes play of two hands, the number can range from two to any number desired. In the case of three played hands, the apparatus would be further configured to duplicate all cards of the second resulting poker hand into a third poker hand, enable holding and replacement of cards in the third poker hand to create a third resulting poker hand, and determining a payout for the third resulting hand. In still other embodiments, the duplication of the current resulting poker hand into a subsequent poker hand and the holding/replacement, can be effected for any number of played hands. As betterment of each hand may occur by way of holding/drawing cards at each level, a tendency for obtaining increasingly higher poker ranks is statistically likely as the player proceeds through the successive levels.

Figure 9A:
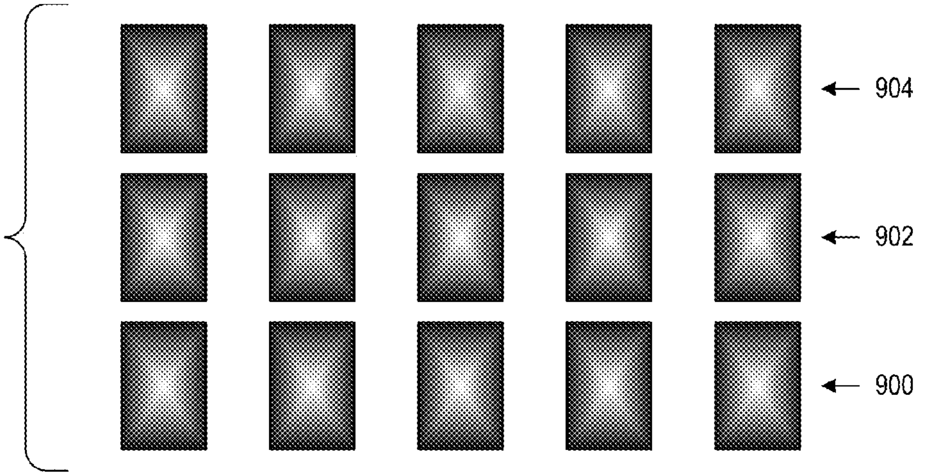
FIGS. 9A-9F illustrate a representative example of an embodiment where resulting poker hands are used as initial poker hands for their respectively successive hands.

FIGS. 9A-9F illustrate a representative example of an embodiment where resulting poker hands are used as initial poker hands for their respectively successive hands. While any number of hands may be played, the example of FIGS. 9A-9F involves three hands for purposes of illustration. FIG. 9A illustrates three hands 900, 902, 904 of five cards, which in one embodiment involves initially dealing all cards face-down.

Figure 9B:
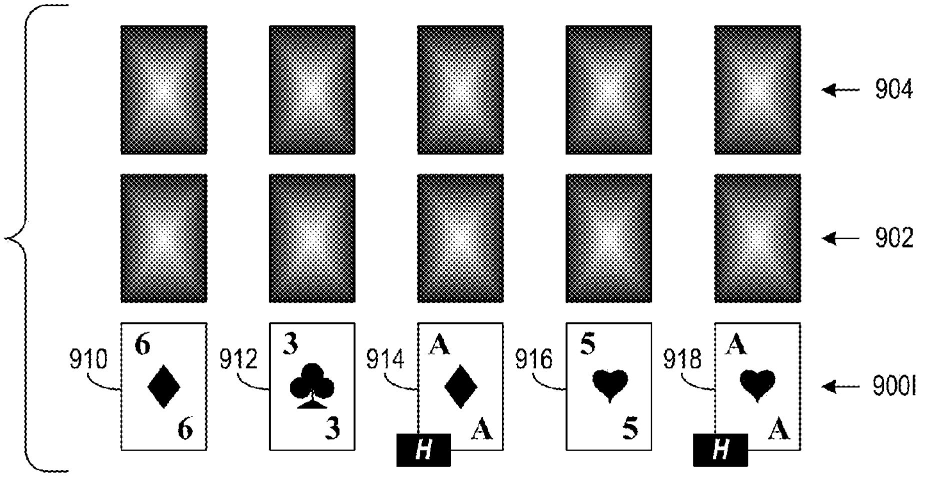

To begin playing a first hand 900, the example of FIG. 9B shows that the cards 910, 912, 914, 916 and 918 of the initial hand 900I are presented face-up. In the illustrated example, the player has opted to hold (or alternatively an auto-hold feature has determined to hold) the Ace-Diamonds 914 and the Ace-Hearts 918. As shown at resulting hand 900R of FIG. 9C, cards 910, 912 and 916 have been replaced with the 5-Clubs 920, 7-Hearts 922 and Ace-Spades 924 respectively. The player may be awarded a payout for the resulting first poker hand 900R that includes cards 920, 922, 914, 924 and 918. For example, the player has received three-of-a-kind (three Aces 914, 924, 918) which may be paid out upon obtaining the three-of-a-kind, or may be paid out afterwards such as when all hands 900, 902, 904 have been played.

Figure 9C:
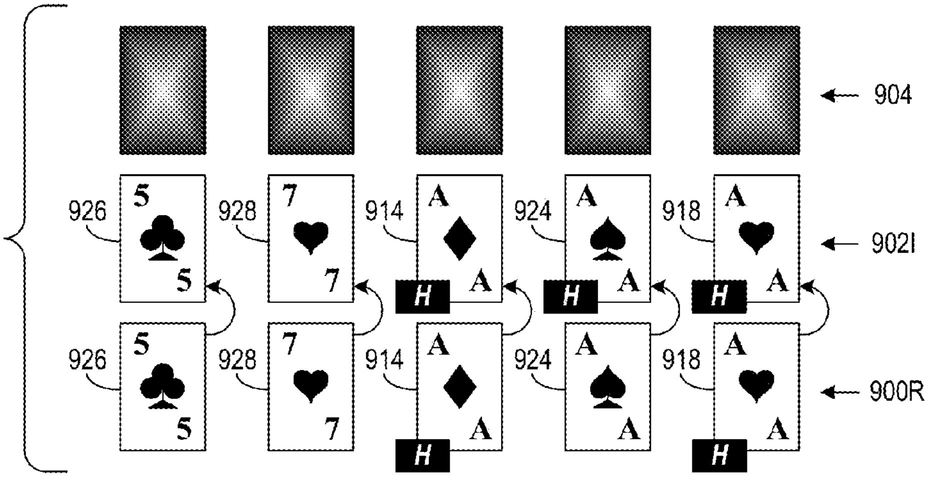
Figure 9D:
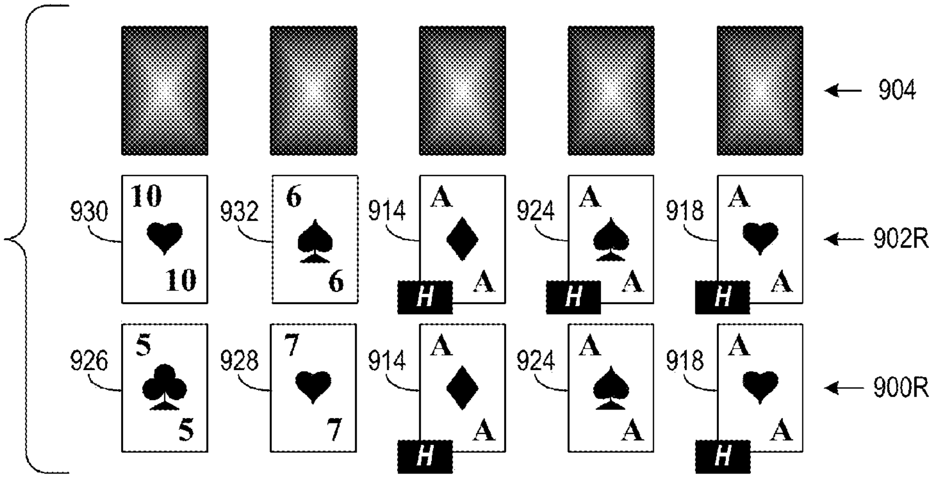

In accordance with one embodiment, the resulting first poker hand 900R is duplicated in its entirety into a successive hand 902I to serve as the initial poker hand (e.g. dealt hand) of second hand 902I. Since the initial second poker hand 902I already includes three-of-a-kind (three Aces), the example of FIG. 9C shows that the player has held the three Aces 914, 924, 918 of initial second hand 902I. Thus, cards 926 and 928 of initial second hand 902I are discarded, and will be replaced (e.g. replaced by "drawing" cards to replace cards 926, 928). The result of such replacement is shown in FIG. 9D, where the resulting second hand 902R includes the three Aces 914, 924 and 918, as well as the two new replacement cards 10-Hearts 930 and 6-Spades 932. In this instance, the resulting second hand 902R has not improved, but the player is again awarded a payout for the resulting second poker hand 902R that includes the three-of-a-kind.

Figure 9E:
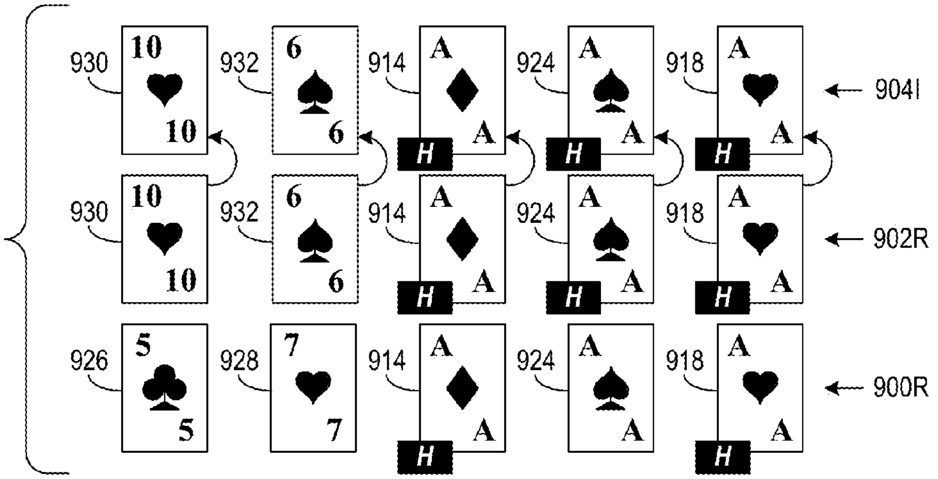
Figure 9F:
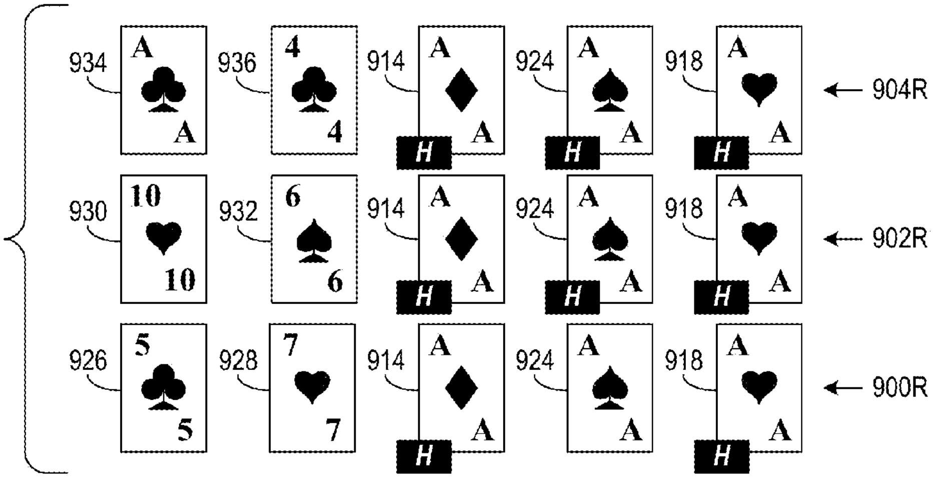

As the representative embodiment involves yet another hand, the resulting second poker hand 902R is duplicated in its entirety into a successive hand 904I to serve as its initial poker hand. This is shown in FIG. 9E, where each of the cards 930, 932, 914, 924 and 918 of the resulting second poker hand 902R is duplicated into cards 930, 932, 914, 924 and 918 of the initial third poker hand 904I. Since the initial third poker hand 904I already includes three-of-a-kind (three Aces), the example of FIG. 9E shows that the player has again held the three Aces 914, 924, 918 of initial third hand 904I. Thus, cards 930 and 932 of initial third hand 904I are discarded, and will be replaced. The result of such replacement is shown in FIG. 9F, where the resulting third hand 904R includes the three Aces 914, 924 and 918, as well as the two new replacement cards A-Clubs 934 and 4-Clubs 936. In this instance, the resulting third hand 904R has improved, as the player has attained four Aces (Ace-Clubs 934, Ace-Diamonds 914, Ace-Spades 924 and Ace-Hearts 918) in the resulting third poker hand 904R.

As can be seen, the process described in connection with FIGS. 9A-9F can continue for any number of hands. The number of hands played may be integral to the game, part of a bonus game, dependent on the wager value of the game (e.g. $1.00 game versus $0.25 game), the number of hands explicitly played and paid for by the player, etc. The principles described herein are equally applicable to any plurality of poker hands, regardless of how the number of multiple hands is arrived at.

A processor-implemented method capable of carrying out such embodiments may include, for example, dealing a first poker hand to a player, facilitating one or more cards of the first poker hand to be held, presenting replacement cards for any of the cards that were not held in the first poker hand to create a first resulting poker hand, duplicating the first resulting poker hand into a second poker hand, facilitating one or more cards of the second poker hand to be held, and presenting replacement cards for any of the cards that were not held in the second poker hand to create a second resulting poker hand.

Figure 10A:
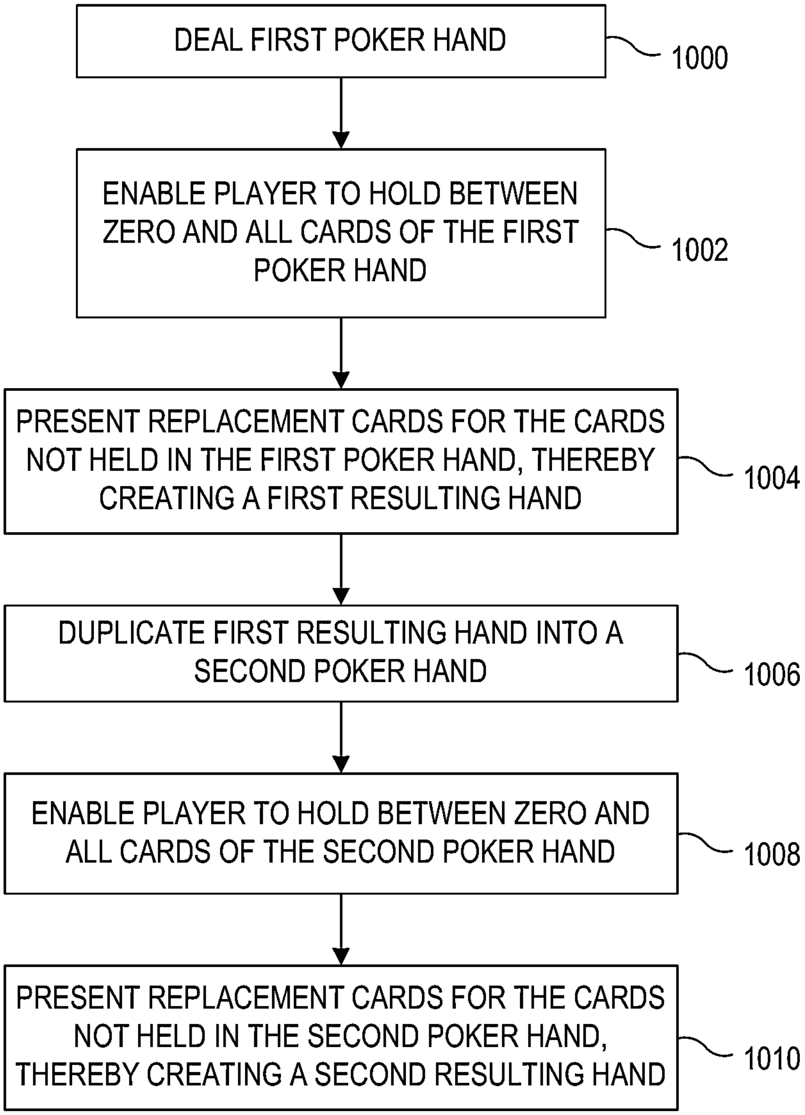
FIGS. 10A-10B are flow diagrams illustrating representative methods for playing multiple poker hands by successively duplicating resulting draw poker hands into subsequent hands.

FIG. 10A is a flow diagram illustrating a representative method for playing multiple poker hands by successively duplicating resulting draw poker hands into subsequent hands. In the illustrated embodiment, a first poker hand is dealt 1000. As shown at block 1002, the player is allowed to hold between zero and all cards of the first poker hand. For example, the player may be allowed to discard all five cards of the draw poker hand, thereby holding zero cards. Alternatively, the player may choose to hold all five cards, which will ultimately be duplicated into at least the next hand as described below.

At block 1004, replacement cards are presented for the cards that were not held in the first poker hand. The inclusion of the replacement cards results in the creation of a first resulting poker hand. This first resulting poker hand, in addition to serving as a payable event in itself, is duplicated 1006 into a second poker hand. This duplicated first resulting hand serves as the initial or dealt hand of the second poker hand. The player is allowed to hold cards of the second poker hand as shown at block 1008. At block 1010, replacement cards are presented for the cards that were not held in the second poker hand. The inclusion of the replacement cards results in the creation of a second resulting poker hand, which may serve as a payable event in itself, as well as the basis for duplication into still further hands.

It should be noted, that in the illustrated embodiment of FIG. 10A, there is no qualification criteria to play the second poker hand. In other words, regardless of the cards and/or poker rank associated with the first poker hand, the player will be allowed to play the second poker hand.

Figure 10B:
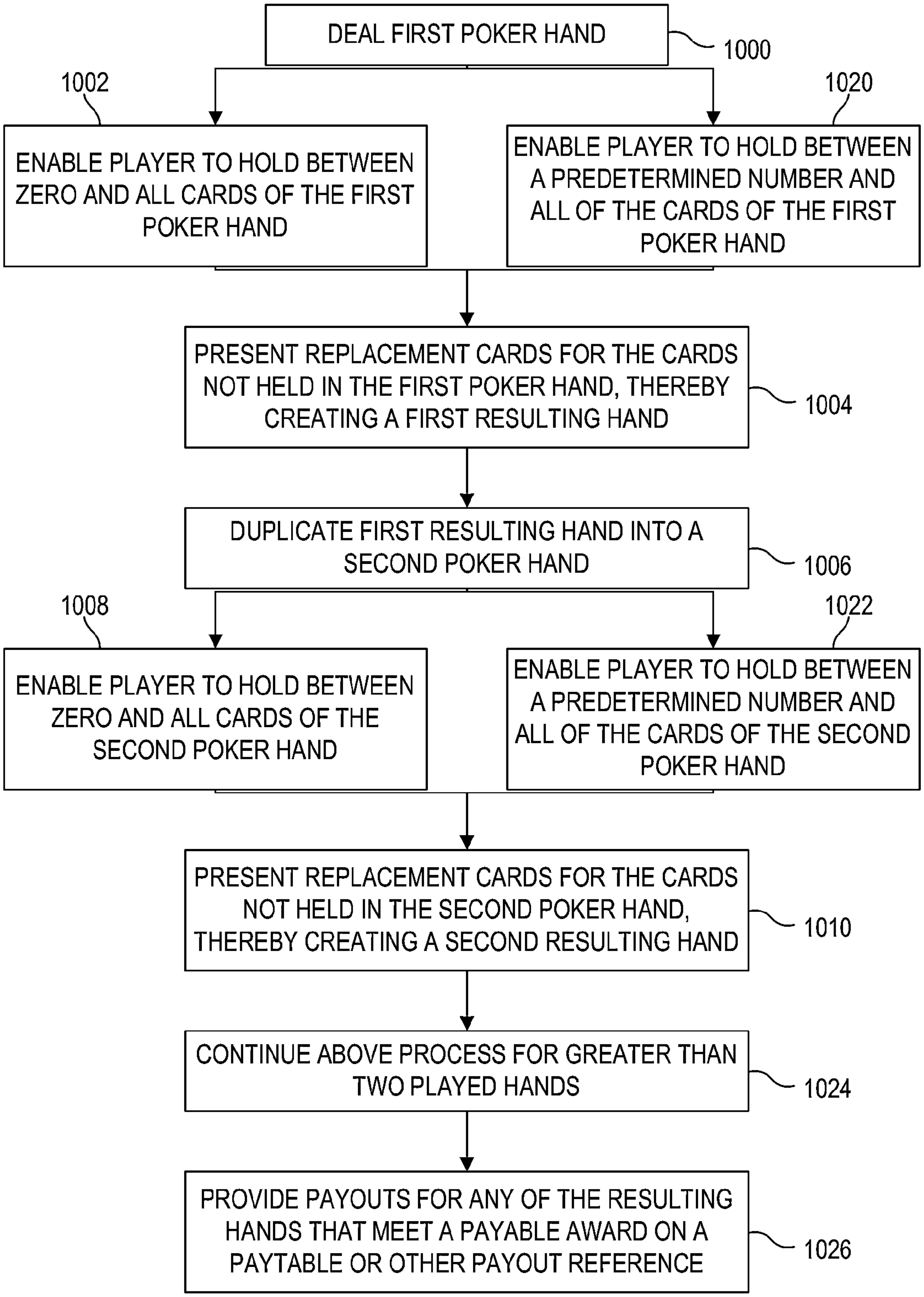

FIG. 10B is a flow diagram illustrating another representative method for playing multiple poker hands by successively duplicating resulting draw poker hands into subsequent hands. This embodiment also involves the features of blocks 1000, 1002, 1004, 1006, 1008 and 1010 described in connection with FIG. 10A. Additionally, FIG. 10B illustrates other embodiments, such as enabling 1020 the player to hold between some predetermined number of cards and all of the cards of the first poker hand. For example, in one embodiment, the player may be allowed to discard up to three cards, in which case the player must hold at least two cards. This can be a requirement at any level, such as depicted by block 1022 where the player is similarly restricted when holding/discarding cards of the second (or later) hand.

FIG. 10B further depicts that the description with two hands is merely representative of an embodiment, and is described for purposes of explanation. However, any number of successively played hands can be associated with the particular gaming event. As shown at block 1024, the above process of dealing a hand, holding/discarding, duplicating a resulting hand into a successive hand to serve as its initial hand, etc., can be continued for any number of hands greater than two. As shown at block 1026, payouts may be provided for any of the resulting hands that meet a payable award on a paytable or other payout reference.

The foregoing description of the exemplary embodiments of the invention has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of the gaming activities. It is intended that the scope of the invention be limited not with this detailed description, but rather determined from the claims appended hereto.

What is claimed is:

1. A wagering gaming device comprising:
- a display device;
- a user interface;
- a memory configured to store a credit amount;
- a wager input device configured to receive and validate currency, wherein currency received from the wager input device is added to the credit amount stored in the memory; and
- a processor configured to:
  - deal a first poker hand to a player via the display device in response to a wager of at least a portion of the credit amount stored in the memory;
  - facilitate, via the user interface, one or more cards of the first poker hand to be held;
  - present replacement cards via the display device for any of the cards that were not held in the first poker hand, to create a first resulting poker hand;
  - duplicate the first resulting poker hand into a second poker hand;
  - automatically hold one or more cards of the second poker hand with the processor; and
  - present replacement cards via the display device for any of the cards that were not held in the second poker hand to create a second resulting poker hand.

2. The wagering gaming device of claim 1, wherein duplicating the first resulting poker hand into a second poker hand comprises duplicating the first resulting poker hand into the second poker hand regardless of a poker rank of the first resulting poker hand.

3. The wagering gaming device of claim 1, wherein duplicating the first resulting poker hand into a second poker hand comprises duplicating the first resulting poker hand into the second poker hand without regard to any of the cards of the first resulting poker hand.

4. The wagering gaming device of claim 1, wherein duplicating the first resulting poker hand into a second poker hand comprises duplicating the first resulting poker hand into the second poker hand without qualification.

5. The wagering gaming device of claim 1, wherein the processor is further configured to determine whether payouts are to be awarded for the first and second resulting poker hands based on poker ranks of each of the first and second resulting poker hands relative to a poker rank paytable.

6. The wagering gaming device of claim 1, wherein the replacement cards for each respective poker hand are provided from respective decks of playing cards.

7. The wagering gaming device of claim 1, wherein the replacement cards for each respective poker hand are provided from the same deck of playing cards.

8. The wagering gaming device of claim 1, wherein the processor is further configured to:
- duplicate the second resulting poker hand into a third poker hand;
- automatically hold one or more cards of the third poker hand with the processor;
- present replacement cards via the display device for any of the cards that were not held in the third poker hand to create a third resulting poker hand.

9. The wagering gaming device of claim 8, wherein duplicating the second resulting poker hand into a third poker hand comprises duplicating the second resulting poker hand into the third poker hand without qualification.

10. The wagering gaming device of claim 8, wherein the processor is further configured to determine whether payouts are to be awarded for the first, second and third resulting poker hands based on poker ranks of each of the first, second and third resulting poker hands relative to a poker rank paytable.

11. The wagering gaming device of claim 8, wherein the processor is further configured to enable N poker hands to be successively played, wherein the first, second and third poker hands represent the first of the N poker hands to be successively played, and further configured to:
- (A) duplicate a current resulting poker hand into a subsequent poker hand;
- (B) automatically hold one or more cards of the subsequent poker hand with the processor;
- (C) present replacement cards via the display device for any of the cards that were not held in the subsequent poker hand to create a corresponding subsequent resulting poker hand; and
- (D) repeat (A)-(C) until all N poker hands have been successively played.

12. The wagering gaming device of claim 11, wherein duplicating the current resulting poker hand into a subsequent poker hand comprises duplicating the current resulting poker hand into the subsequent poker hand without qualification.

13. The wagering gaming device of claim 11, wherein the processor is further configured to determine whether payouts are to be awarded for each of the resulting poker hands of the N poker hands based on their respective poker ranks relative to a poker rank paytable.

14. A gaming apparatus comprising:
- a display;
- a memory configured to store a credit amount;
- a wager input device configured to receive and validate currency, wherein currency received from the wager input device is added to the credit amount stored in the memory;
- a user interface; and
- a processor coupled to the user interface and configured with instructions that cause the apparatus to:
- present a first poker hand to a player via a display device;
- hold between zero and all cards of the first poker hand as specified via the user interface;
- present replacement cards via the display device for any of the cards that were not held in the first poker hand, to create a first resulting poker hand;
- determine a payout on the first resulting poker hand;
- duplicate all cards of the first resulting poker hand into a second poker hand;
- automatically hold between zero and all cards of the second poker hand as specified by the processor;
- present replacement cards via the display device for any of the cards that were not held in the second poker hand, to create a second resulting poker hand; and
- determine a payout on the second resulting poker hand.

15. The gaming apparatus of claim 14, wherein the processor is further configured with instructions that cause the apparatus to:

duplicate all cards of the second resulting poker hand into a third poker hand;

automatically hold between zero and all cards of the third poker hand as specified by the processor;

present replacement cards via the display device for any of the cards that were not held in the third poker hand, to create a third resulting poker hand; and determine a payout on the third resulting poker hand.

16. The gaming apparatus of claim 15, wherein the processor is further configured to enable N poker hands including the first, second and third poker hands to be successively played, and further configured to:

(A) duplicate a current resulting poker hand into a subsequent poker hand;

(B) automatically hold between zero and all cards of the subsequent poker hand;

(C) present replacement cards via the display device for any of the cards that were not held in the subsequent poker hand, to create a corresponding subsequent resulting poker hand; and (D) repeating (A)-(C) until all N poker hands have been successively played.

17. The gaming apparatus of claim 16, wherein the processor is further configured with instructions that cause the apparatus to determine whether a payout is to be awarded for each of the N poker hands.

18. A method of operating a gaming system including a processor, a display device, a user interface, a memory, and a wager input device configured to receive and validate currency, the method comprising:

receiving a signal at the processor from the wager input device that valid currency was received;

storing in the memory a credit amount associated with received currency in response to the received signal;

dealing a first poker hand to a player via the display device in response to a game being initiated with a wager based at least in part on the stored credit amount;

facilitating, via the user interface, one or more cards of the first poker hand to be held;

presenting replacement cards via the display device for any of the cards that were not held in the first poker hand, to create a first resulting poker hand;

duplicating the first resulting poker hand into a second poker hand;

automatically holding one or more cards of the second poker hand with the processor;

presenting replacement cards via the display device for any of the cards that were not held in the second poker hand, to create a second resulting poker hand.

19. The method of claim 18, wherein the processor automatically holds one or more cards in the second hand to maximize awards in the second hand based on a poker rank paytable.

20. The method of claim 18, wherein separate decks of cards are used to respectively present replacement cards for the first poker hand and the second poker hand.

* * * * *